(12) United States Patent
Mazzer

(10) Patent No.: US 6,777,051 B1
(45) Date of Patent: Aug. 17, 2004

(54) PROTECTIVE SHEATH FOR FLEXIBLE TUBES

(75) Inventor: Giacomo Ezio Mazzer, Erba (IT)

(73) Assignees: Giacoma Ezio Mazzer, Erba (IT); Tecnotexil S.r.l., Albino (IT)

(*) Notice: Subject to any disclaimer, the term of this patent is extended or adjusted under 35 U.S.C. 154(b) by 159 days.

(21) Appl. No.: 10/070,686

(22) PCT Filed: Aug. 6, 2001

(86) PCT No.: PCT/IT01/00433
§ 371 (c)(1), (2), (4) Date: Mar. 8, 2002

(87) PCT Pub. No.: WO02/14589
PCT Pub. Date: Feb. 21, 2002

(30) Foreign Application Priority Data

Aug. 11, 2000 (IT) .................. MI2000483 U

(51) Int. Cl.[7] .................. B23B 5/26; B29D 22/00; D03D 3/00; F16L 11/00

(52) U.S. Cl. .................. 428/36.1; 442/239; 138/36; 138/118.1; 139/384 R; 139/387 R; 139/420 R

(58) Field of Search .................. 138/36, 110, 153, 138/118.1; 139/383 R, 384 R, 386, 387 R, 420 R; 428/35.7, 36.1, 222; 442/239

(56) References Cited

U.S. PATENT DOCUMENTS 5,800,514 A * 9/1998 Nunez et al. .............. 623/1.51

FOREIGN PATENT DOCUMENTS

DE 198 03 169 7/1999

* cited by examiner

Primary Examiner—Cheryl A. Joska
Assistant Examiner—Jenna-Leigh Befumo
(74) Attorney, Agent, or Firm—Wenderoth, Lind & Ponack, L.L.P.

(57) ABSTRACT

A protective sheath made of a woven synthetic fabric having a structure formed of high tenacity warp and weft yarns, the count of the yarns ranging from 400 to 2000 decitex and the number of the yarns ranging from 54 to 78 yarns per centimeter. The woven synthetic fabric is chemically finished with continuous dyeing process.

11 Claims, 1 Drawing Sheet

PROTECTIVE SHEATH FOR FLEXIBLE TUBES

TECHNICAL FIELD

The present invention relates to a protective sheath for covering flexible tubes that are customarily used in hydraulic systems of various kinds of equipment, machines and motor vehicles.

BACKGROUND ART

As known, the sheaths of the above mentioned kind are used mainly for the purpose of protecting the operatives and the environment in the case of a leakage or jet of oil caused by a failure or defective operation of the flexible tubes.

For attaining this purpose, the sheaths must assure in use an appropriate degree of safety and reliability in order to fulfil the requirements of the hydraulic systems of equipment, machines and motor vehicles which generally operate under very severe conditions as regards the mechanical and thermal stresses and are installed in places subject to the action of water, snow and dirt.

In particular, the sheaths must offer a good resistance to abrasion and flame and have to perform a sealing action in the case of leakage of pressurised oil from the flexible tube on which they are fitted.

Furthermore, the sheaths must contain the fluid stream issuing from the flexible tube in the case of an explosion thereof and they must assure an electrical resistivity similar to that of the tube on which they are fitted.

The conventional sheaths known in the art are adapted for use in operating conditions which mostly do not correspond to those of the user.

DISCLOSURE OF THE INVENTION

The object of the present invention is to provide a protective sheath improved as to its technical and manufactural features and adapted to assure in use a greater safety and reliability than that till now obtainable with the protective sheaths known in the art and available on the market, thereby meeting effectively the utilisation requirements in various operating conditions.

BEST MODE FOR CARRYING OUT THE INVENTION

Figure 1:
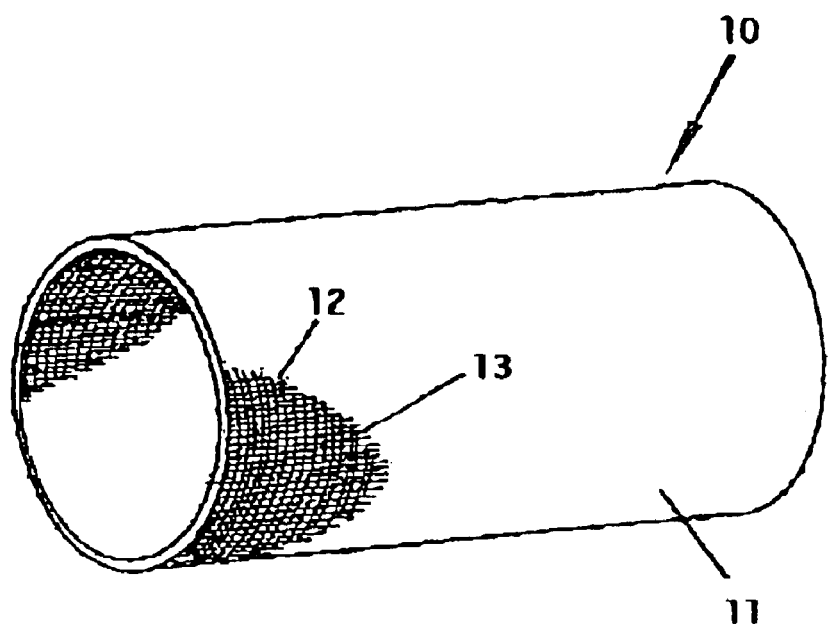
FIG. 1 of the drawing is a perspective view of a section of a protective sheath constructed in accordance with the present invention.

FIG. 1 illustrates a protective sheath 10 according to the present invention. The protective sheath 10 is made of a woven synthetic fabric 11 having a structure formed of high tenacity warp 12 and weft 13 yarns. The count of the yarns ranges from 400 to 2000 decitex and the number of yarns ranges from 54 to 78 yarns per centimeter. The woven synthetic fabric is chemically finished with a continuous dyeing process.

According to a feature of the present invention, the yarns used to make the sheath are made of polyamide (PA) or polyester (PES).

Figure 2:
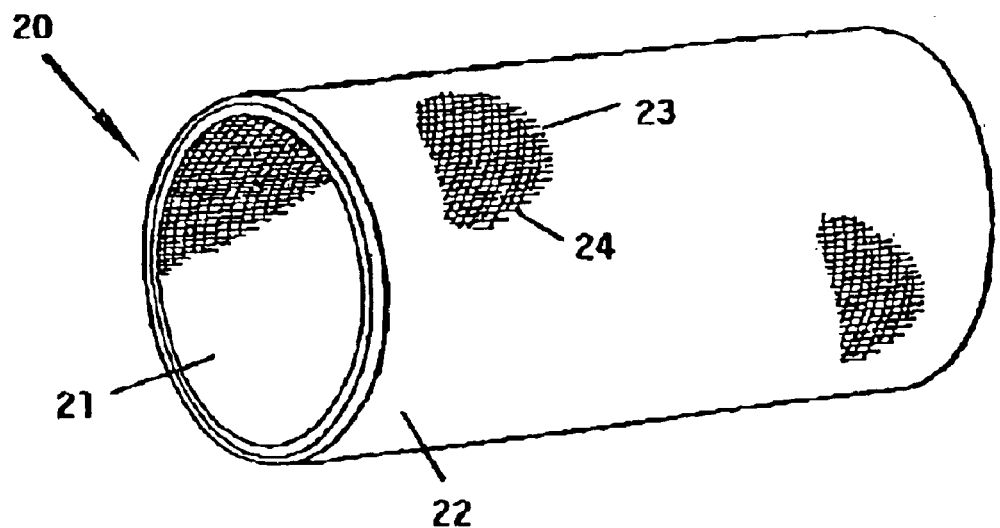
FIG. 2 of the drawing is a perspective view of a section of a protective sheath constructed in accordance with a variant of the present invention.

FIG. 2 illustrates a protective sheath 20 according to a variant of the present invention. The protective sheath 20 is formed of a multi-layer fabric comprising an inner layer 21 and an outer layer 22 of a woven synthetic fabric, each layer of the multi-layer fabric having a structure formed of high tenacity warp 23 and weft 24 yarns. The weft 23 yarns of one layer are interlaced with the warp 24 yarns of the other layer according to a construction which is known in the art. The count of the yarns ranges form 400 to 2000 decitex and the number of the yarns ranges from 54 to 78 yarns per centimeter. Each layer of the multi-layer fabric is chemically finished with a continuous dyeing process, whereby the layers of the multi-layer fabric are dyed with different colors, thus permitting the degree of wear of the outer layer of the multi-layer fabric to be indicated.

In order to verify the degree of safety and reliability of the protective sheath of the invention, this has been subject to tests simulating the most frequent working conditions in which the flexible tubes may operate. In particular, the following tests have been carried out:
1. Abrasion Resistance Test
2. Pressure Test
3. Explosion Test
4. Flame Resistance Test
5. Resistivity Test
6. Pinhole Test 1. Abrasion Resistance Test The abrasion resistance test has been carried out according to the specifications of the International Standard ISO 6945 (UNI En 7058). A specific equipment with an abrasion test sharp-edged instrument preloaded with 50 newtons has been used in this test.

The sheaths known in the art and available on the market have assured a resistance to abrasion up to 18000 cycles.

The sheath according to the invention has assured a resistance to abrasion up to 50000 cycles, with a maximum quantity of material removed equal to 20 milligrams.

At the end of the abrasion test, the single yarns of the fabric have been drawn out from the sheath with the object of subjecting them to a tensile test up to the ultimate tensile stress for the purpose of ascertaining the real structural deterioration due to the abrasion test. The tensile test showed that the fabric yarns of the sheath according to the invention after the abrasion resistance test were in a better condition than those of conventional sheaths and that they had an ultimate tensile stress value which in the average was 300% greater.

2. Pressure Test

This test has been carried out for the purpose of verifying the ability of the sheath to withstand the pressure of oil by simulating the condition in which a jet of oil issues from the flexible tube because of a burst or failure thereof during operation. In the test, specimens of sheaths having a length of 330 mm have been placed on a test bench with their ends fastened by means of clamps and subjected to increasing pressure values.

The conventional sheaths showed leakage at pressure values lower than 2 bars occurring few seconds after pressurisation.

The sheath according to the invention assured tightness up to a pressure value of 8 bars before starting to leak as the conventional sheaths. The leakage occurred 15 seconds after pressurisation.

3. Explosion Test

In order to carry out the explosion test, the sheaths have been fitted on a spirally wound flexible tube having an inner diameter of 19 mm according to the Standard 4SH-DIN 20023 and pressurised up to the minimum burst pressure value of 2.100 bars.

The sheaths of conventional kind were completely broken upon a burst at the middle of the tube whereby a great leakage of oil occurred.

The sheath according to the invention was only partially broken upon the burst at the middle of the tube and offered a better containment of the oil issuing from the tube.

4. Flame Resistance Test.

The flame resistance test has been carried out in accordance with the specifications of the International Standard ISO 8030 by exposing the sheaths to the flame for a period of 60 seconds.

During the exposure to flame, the conventional sheaths resisted for 8 seconds before completely melting and permitting the flame to propagate.

The sheaths according to the invention started to melt only after 15 seconds, offering at the same time a better barrier against propagation of flame.

5. Resistivity Test.

The resistivity test was performed following the specifications of the International Standard ISO 8031. The sheaths were fitted on various kinds of flexible tubes and the values of resistance per unit length were measured by applying to the flexible tubes covered by the sheath a d.c. voltage of 500 volts.

The sheath according to the invention showed a resistance per unit length of $3 \times 10^6$ to $5 \times 10^6$ ohms/meter, which is less than that required by the standard corresponding to $10^7$ ohms/meter.

6. Pinhole Test

This test was performed by fitting the sheaths having a diameter of 30 mm on a DIN 4SP tube with an inner diameter of 13 mm and an operating pressure of 420 bars. A pierce was formed in the tube with a diameter of 1 mm for the purpose of simulating the so-called "pinhole effect". The tube was subjected to a test pressure of 210 bars in order to ascertain the operation of the sheaths.

By applying and keeping a pressure of 210 bars to the conventional sheaths, a continuous jet of oil was produced which issued from the sheaths in a very clearly way.

By applying and keeping a test pressure of 210 bars to the sheath according to the invention, a spot of oil appeared at the hole formed in the tube, but there was no leakage of oil through the sheath. The sheath of the invention offered therefore a better containment of oil. From the foregoing it is clear that the sheath according to the invention reaches the aimed object. In particular, the protective sheath is improved as to the technical and manufactural features and is adapted to assure in operation a greater safety and reliability than that till now obtainable with the protective sheaths-known in the art and available on the market. As a matter of fact the sheath of the invention is capable of containing any leakage (bleeding, dripping, jets caused by microporosity, bursts) which may occur in flexible tubes of hydraulic systems of equipment, machines and motor vehicles of various kinds.

Furthermore, the sheath of the invention is made in compliance with national and international standards relating safety and protection as to the components, their operation and reliability.

What is claimed is:

1. A protective sheath made of a woven synthetic fabric having a structure formed of high tenacity warp and weft yarns, the count of said yarns ranging from 400 to 2000 decitex and the number of said yarns ranging from 54 to 78 yarns per centimeter, said woven synthetic fabric being chemically finished with a continuous dyeing process.

2. A protective sheath according to claim 1, wherein said woven synthetic fabric is physically finished with a calendering process.

3. A protective sheath according to claim 1, wherein the warp and weft yarns are made of a synthetic material selected from the group consisting of polyamide (PA) and polyester (PES).

4. A protective sheath according to claim 3, wherein the warp and weft yarns made of polyamide (PA) have a count of 470, 630, 940, 1400 or 1800 decitex.

5. A protective sheath according to claim 3, wherein the warp and weft yarns made of polyester (PES) have a count of 400, 500, 600, 800, 1000, 1100 or 2000 decitex.

6. A protective sheath formed of a multi-layer fabric comprising an inner layer and an outer layer of a woven synthetic fabric, each layer of the multi-layer fabric having a structure formed of high tenacity warp and weft yarns, the count of said yarns ranging from 400 to 2000 decitex and the number of said yarns ranging from 54 to 78 yarns per centimeter, and each layer of said multi-layer fabric being chemically finished with a continuous dyeing process, whereby said layers of the multi-layer fabric are dyed with different colors, thus permitting the degree of wear of the outer layer of the multi-layer fabric to be indicated.

7. A protective sheath according to claim 6, wherein said layers of the multi-layer fabric are physically finished with a calendering process.

8. The combination of a flexible tube for conveying an energy transmitting fluid and a protective sheath enclosing said flexible tube, wherein said protective sheath is made of a woven synthetic fabric having a structure formed of high tenacity warp and weft yarns, the count of said yarns ranging from 400 to 2000 decitex and the number of said yarns ranging from 54 to 78 yarns per centimeter, said woven synthetic fabric being chemically finished with a continuous dyeing process.

9. The combination of claim 8, wherein said woven synthetic fabric is physically finished with a calendering process.

10. The combination of a flexible tube for conveying an energy transmitting fluid and a protective sheath enclosing said flexible tube, wherein said protective sheath is formed of a multi-layer fabric comprising an inner layer and an outer layer of a woven synthetic fabric, each layer of the multi-layer fabric having a structure formed of high tenacity warp and weft yarns, the count of said yarns ranging from 400 to 2000 decitex and the number of said yarns ranging from 54 to 78 yarns per centimeter, and each layer of said multi-layer fabric being chemically finished with a continuous dyeing process, whereby said layers of the multi-layer fabric are dyed with different colors, thus permitting the degree of wear of the outer layer of the multi-layer fabric to be indicated.

11. The combination of claim 10, wherein each layer of said multi-layer fabric is physically finished with a calendering process.

* * * * *

UNITED STATES PATENT AND TRADEMARK OFFICE
CERTIFICATE OF CORRECTION

PATENT NO. : 6,777,051 B1
DATED : August 17, 2004
INVENTOR(S) : Giacomo Ezio Mazzer It is certified that error appears in the above-identified patent and that said Letters Patent is hereby corrected as shown below:

Title page,
Item [73], Assignee, change "Giacoma" to -- Giacomo --.

Signed and Sealed this

Thirty-first Day of May, 2005

JON W. DUDAS
*Director of the United States Patent and Trademark Office*